J. SCHIES.
WIND MOTOR.
APPLICATION FILED OCT. 15, 1909.
974,995.
Patented Nov. 8, 1910.
2 SHEETS—SHEET 1.
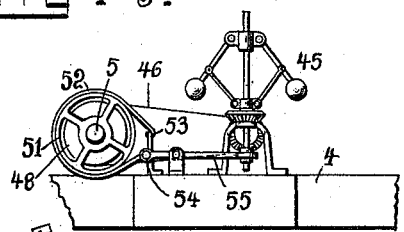
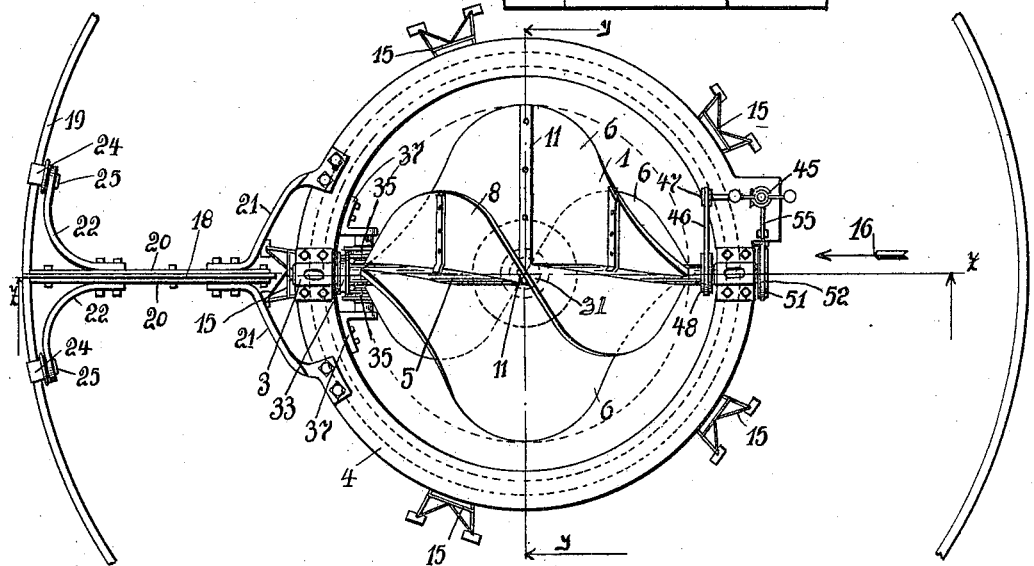
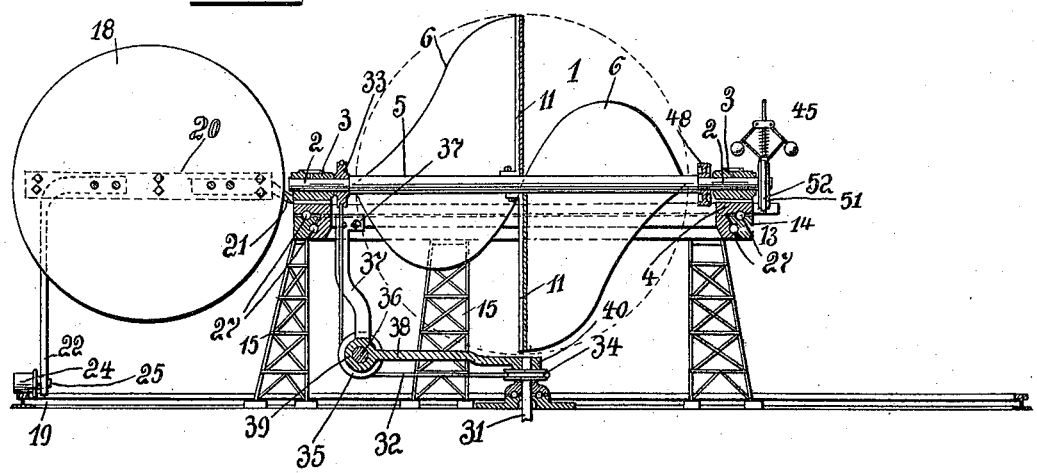

J. SCHIES.
WIND MOTOR.
APPLICATION FILED OCT. 15, 1909.

974,995.

Patented Nov. 8, 1910.
2 SHEETS—SHEET 2.

Witnesses:
C. Klostermann
Lillian Burnett

Inventor:
John Schies,
by D. J. Herbert
his Attorney

THE NORRIS PETERS CO., WASHINGTON, D. C.

UNITED STATES PATENT OFFICE.

JOHN SCHIES, OF ANDERSON, INDIANA, ASSIGNOR TO INTERNATIONAL AERIAL POWER COMPANY, OF PHOENIX, ARIZONA TERRITORY, A CORPORATION OF ARIZONA TERRITORY.

WIND-MOTOR.

974,995.   Specification of Letters Patent.   Patented Nov. 8, 1910.

Application filed October 15, 1909. Serial No. 522,862.

*To all whom it may concern:*

Be it known that I, JOHN SCHIES, a citizen of the United States, residing at Anderson, in the county of Madison and State of Indiana, have invented certain new and useful Improvements in Wind-Motors, of which the following is a specification.

Figure 3:
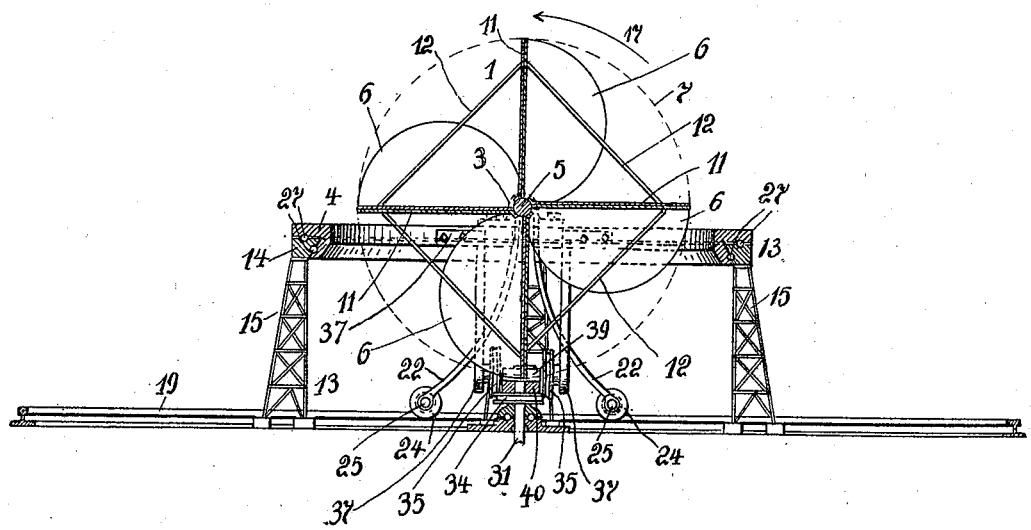
Figure 4:
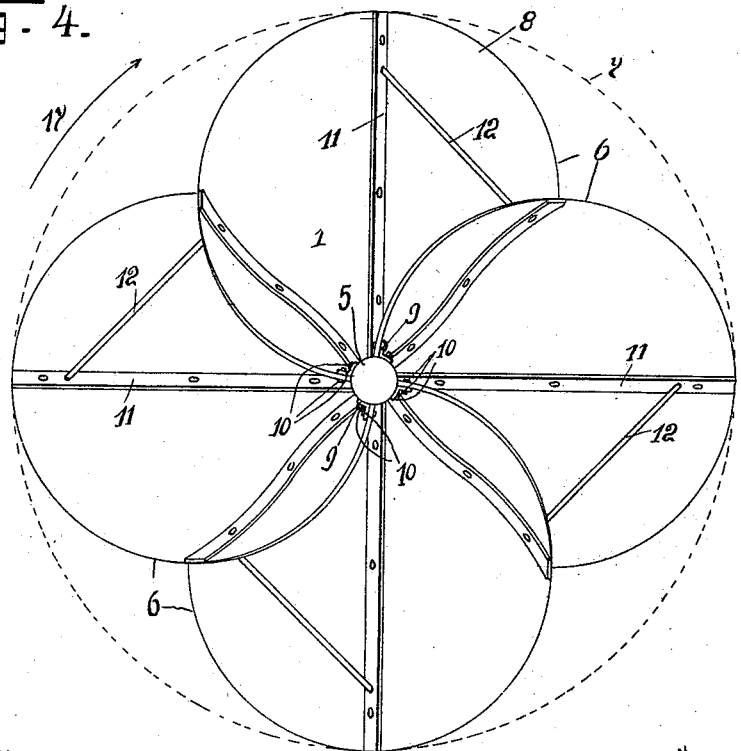

My invention relates to wind motors, and has for its object the provision of a wind motor of novel form for utilizing the movements of the air in efficient manner, and is especially applicable to power units of great capacity, and the invention will be readily understood from the following description and claims, and from the drawings, in which latter:

Figure 1 is a plan view of my improved device, with the outer track broken away. Fig. 2 is a vertical section of the same, taken on the line z—z of Fig. 1. Fig 3 is a vertical cross-section of the same taken on the line y—y of Fig. 1. Fig. 4 is a rear end elevation of the propulsion-wheel; and, Fig. 5 is a side elevation of the controlling device for the propulsion-wheel.

1 represents the propulsion-wheel which rotates on trunnions 2 in bearings 3 of a shifting-member 4, in the direction of the arrow 17. The trunnions are shown as the ends of a shaft 5 of the propulsion-wheel.

6 are wings of the propulsion-wheel and are shown arranged spirally with relation to the rotary axis of the propulsion-wheel and extend longitudinally of said axis. They are shown spirally secured about the shaft 5 which acts as a central supporting member for the propulsion-wheel. The wings are preferably of greatest width at their mdidle and recede in width toward their ends, their outer edges, in the form shown, when rotating, describing a path in the form substantially of a sphere, indicated by the dotted line 7. The wings may comprise sheets 8, which respectively have an inner flange 9 bolted to the shaft by bolts 10, the sheets being supported on ribs 11 secured to the central member of the wheel, and the wings may, preferably adjacent their circumferential ends, be connected by tension members 12, shown in the form of rods, for bracing the outer ends of the wings from each other. Other suitable means may be provided for securing the wings about a central supporting member.

There is a supporting structure 13, between which and the shifting-member 4 there is a guideway 14. The supporting structure is shown as comprising uprights 15 connected at their upper ends by the guideway, shown as a circular guideway for the shifting-member, the said guideway encompassing the propulsion-wheel. The supporting structure brings the shifting-member and the bearings for the trunnions of the propulsion-wheel to proper elevation for permitting the propulsion-wheel to rotate freely, and locating its support and the guideway upon which the bearings have movement, adjacent to the rotary axis of the propulsion-wheel, with its ends moving laterally in opposite directions for presenting its axis of rotation parallel to the direction of the wind, indicated by the arrow 16. The construction stated also causes a minimum number of parts to move with the propulsion-wheel for directing the same into the path of the wind and allows the turning to be accomplished with minimum power. For aiding or accomplishing this shifting of the direction of extension of the rotary axis of the propulsion-wheel, I provide a directing-vane 18, which is secured to the shifting-member 4 and which has a support which rides upon a track 19. Reinforce plates 20 are preferably provided for the respective sides of the vane, to which brackets 21 are secured, the brackets being also secured to the shifting-member. Legs 22 are secured to the plates 20, and have wheels 24 mounted on studs 25 in the legs, the wheels riding upon the track 19. The track is preferably a circular track encompassing the supporting structure and is distanced therefrom.

The moving connection between the shifting-member and guideway is preferably provided by antifriction bearings, shown as ball-bearings 27, for permitting the shifting-member to turn freely upon the guideway. The antifriction bearings are preferably so formed as to prevent tilting of the same out of the guideway.

31 represents the operating shaft, shown as a vertical shaft, to which motion may be imparted from the propulsion-wheel, which is shown rotating on a substantially horizontal axis. This operative connection may be accomplished by means of an endless cable 32 received about the pulley 33 on the shaft 5 and a pulley 34 on the operating shaft, the cable being directed over sheaves 35 for changing its direction of travel and bringing the same out of the path of the propulsion-wheel.

The sheaves are mounted on a shaft 36 in hangers 37 depending from and secured to the shifting-member 4 and preferably distanced from the operating shaft by a brace 38 which has a bearing 39 thereon for the shaft 36 at its outer end and a bearing 40 about the operating shaft at its inner end. When the shifting-member is shifted, it carries the hangers, sheaves and brace with it about the axis of the operating shaft, the vane-supports also simultaneously moving upon the outer track. Regulating means may also be provided for regulating the speed of rotation of the propulsion-wheel. I have shown these means in the form of a governor 45 mounted on the shifting-member 4 and rotated by a belt 46 passing over the governor-pulley 47 and a pulley 48 on the shaft 5.

51 is a brake-wheel secured to the shaft 5, a strap 52 being received about the brake-wheel, the frictional resistance between the brake-wheel and strap being regulated by the governor. One end of the strap is shown stationarily secured to the shifting-member on a lug 53, the other end of the strap being articulated at 54 to a lever 55 controlled by the governor for exerting more or less frictional resistance by the strap upon the brake-wheel. The operating shaft may communicate motion to suitable machinery.

My invention permits the force of the wind to be utilized in economical manner and presents large contact-surface therefor and permits the ready automatic presentation of the axis of rotation of the propulsion-wheel into parallelism with the path of the wind by means which permit ready movement and easy carriage of the weight of the moving parts, and permits power units of large capacities to be constructed.

The supporting faces of the guideway for the lateral shifting of the propulsion-wheel are preferably in lateral planes adjacent to the lateral plane of the rotary axis of said wheel, while the guideway for the support of the directing-vane is in a lateral plane preferably as low as the lateral plane in which the lower edge of the propulsion-wheel is located for permitting free access of the wind to the propulsion-wheel. This construction aids in preventing any tipping of the shifting-member for holding the same to its guideway. It also affords ease of movement of the parts for automatically shifting the axis of rotation of the propulsion-wheel into parallelism with the direction of the wind, in that it locates the directing vane vertically between the two annular guideways, which are located outside the spherical path of travel of the outer edges of the wings of the propulsion-wheel.

It also affords an economical construction for locating these guideways in the positions stated, as the elevated guideway is mounted at the top of the supporting structure, while the lower guideway is located in horizontal plane substantially coincident with the base of said supporting structure, and may be on the ground. The propulsion-wheel is supported at both ends in the shifting-member, a tail-support of the directing-vane being also provided, these supports acting in conjunction with each other for permitting easy and automatic shifting of the moving parts of the apparatus.

Having thus fully described my invention, what I claim as new and desire to secure by Letters Patent is:

1. In a wind motor, the combination of a propulsion-wheel comprising a substantially horizontal central supporting shaft and wings arranged spirally and longitudinally about said central supporting shaft and extending longitudinally of the axis of rotation of said central supporting shaft, the said wings secured spirally along their longitudinal inner edges to said central supporting shaft and forming closed connection therewith, a supporting structure having a guideway thereon about said propulsion-wheel, a shifting member in which said propulsion-wheel is journaled having movement along said guideway, the outer edges of said wings describing a path of travel which resembles a sphere whose central horizontal perimeter is closely adjacent to and is substantially equidistant from said guideway at all points thereof irrespective of the direction in which the said axis of rotation of said propulsion-wheel extends, substantially as described.

2. In a wind motor, the combination of a supporting structure, a shifting-member, there being a guideway between said supporting structure and shifting-member adjacent their outer edges, the said shifting-member having rotary movement along said guideway, a propulsion-wheel having a substantially horizontal axis of rotation, said propulsion-wheel journaled in and movable with said shifting member and having propulsion-wings arranged spirally and longitudinally about said axis of rotation of said propulsion wheel, the outer edges of said wings describing a path of travel which resembles a sphere whose central horizontal perimeter is closely adjacent to and is substantially equidistant from said guideway at all points thereof irrespective of the direction in which said axis of rotation of said propulsion-wheel extends, substantially as described.

3. In a wind motor, the combination of a central elevated structure, a circular track around the same and distanced therefrom and located in substantially the horizontal plane of the base of said structure, said central elevated structure having a circular guideway at its top, a shifting-member having movement on said guideway, a propulsion-wheel journaled on said shifting-member, said propulsion-wheel comprising wings arranged spirally and longitudinally about the axis of rotation of said propulsion-wheel, the outer edges of said wings when rotating describing a path of travel which resembles a sphere whose central horizontal perimeter is substantially equidistant at all points from said circular guideway and is located in substantially coincident horizontal plane with said guideway, a hanger secured to said shifting-member and depending therefrom toward said track, anti-friction bearing means between said hanger and track, and an automatically acting directing-vane secured to said hanger and located vertically between said guideway and track and arranged for automatically shifting said shifting-member by the wind for automatically shifting the rotary axis of said propulsion-wheel into substantial parallelism with the direction of travel of said wind, substantially as described.

4. In a wind motor, the combination of a propulsion-wheel comprising wings arranged spirally about the axis of rotation of the propulsion-wheel and extending longitudinally of said axis, a shifting-member upon which said propulsion-wheel is journaled, a guideway for said shifting-member, an upright shaft, a hanger suspended from said shifting-member, a brace pivoted about the axis of rotation of said upright shaft, sheaves supported at the junction of said hanger and brace, and flexible driving connection between said propulsion-wheel and upright shaft received about said sheaves.

5. In a wind motor, the combination of a propulsion-wheel comprising wings arranged spirally about the axis of rotation of the propulsion-wheel and extending longitudinally of said axis, a shifting-member upon which said propulsion-wheel is journaled, a guideway for said shifting-member closely adjacent to both ends of said propulsion-wheel, said guideway and the rotary axis of said propulsion-wheel being in substantially coincident horizontal planes, an operating shaft, driving connection between said propulsion-wheel and operating shaft, and controlling means for controlling the speed of rotation of said propulsion-wheel.

6. In a wind motor, the combination of a propulsion-wheel comprising wings spirally arranged about the rotary axis of said propulsion-wheel, the outer ends of said wings having a path of travel which is substantially spherical in form, a shifting-member in which said propulsion-wheel is journaled, a guideway for said shifting-member located in a lateral plane adjacent to the lateral plane of the axis of rotation of said propulsion-wheel, an automatically acting directing vane, and a guideway for said directing vane located in a lateral plane adjacent to the lateral plane of the lower extremity of said path of the outer ends of said wings, said automatically acting directing vane arranged for being automatically acted on by the wind for automatically shifting said rotary axis of said propulsion-wheel into substantial parallelism with said wind. substantially as described.

7. In a wind motor, the combination of a central structure having an elevated circular guideway thereon, a shifting-member having anti-friction bearing on said guideway, a propulsion-wheel having a substantially horizontal axis of rotation in substantially coincident horizontal plane with said anti-friction bearing, and comprising propulsion-wings arranged spirally and longitudinally about said axis of rotation of said propulsion-wheel, the outer edges of said propulsion-wings when rotating describing a path which is substantially spherical in form, said propulsion-wheel journaled in said shifting-member in position for bringing said spherical path closely adjacent to said anti-friction bearing throughout the extent of the latter, a depending support extending from said shifting-member, a second circular guideway in a horizontal plane substantially coincident with the horizontal plane of the lower extremity of said spherical path of travel, and an automatically acting directing vane on said depending support between said circular guideways arranged to be acted on by the wind for automatically shifting the axis of rotation of said propulsion-wheel into substantial parallelism with the wind by lateral pressure exerted on said directing vane by said wind between said circular guideways which are located outside said spherical path of travel of said propulsion-wheel, substantially as described.

In testimony whereof, I have signed my name hereto in the presence of two subscribing witnesses.

JOHN SCHIES.

Witnesses:
LILLIAN BURNETT,
CARL LEHMANN.